Figure 1:
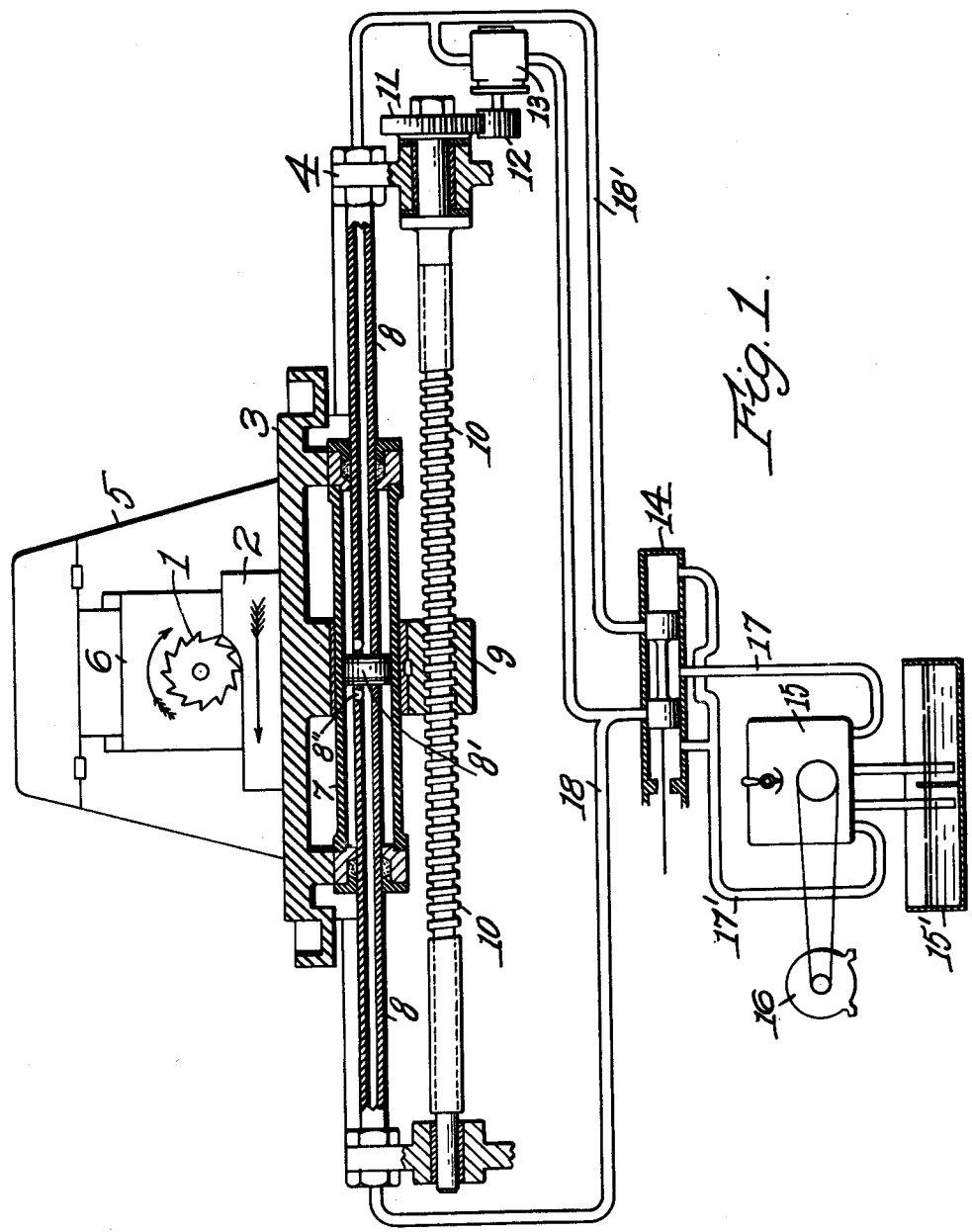

Feb. 2, 1943    E. L. FICKETT ET AL    2,309,637

CLIMB MILLING MACHINE

Filed Sept. 5, 1939    2 Sheets-Sheet 1

INVENTORS
Ernest L. Fickett
BY William O. Forman
Charles R. Ray
ATTORNEY

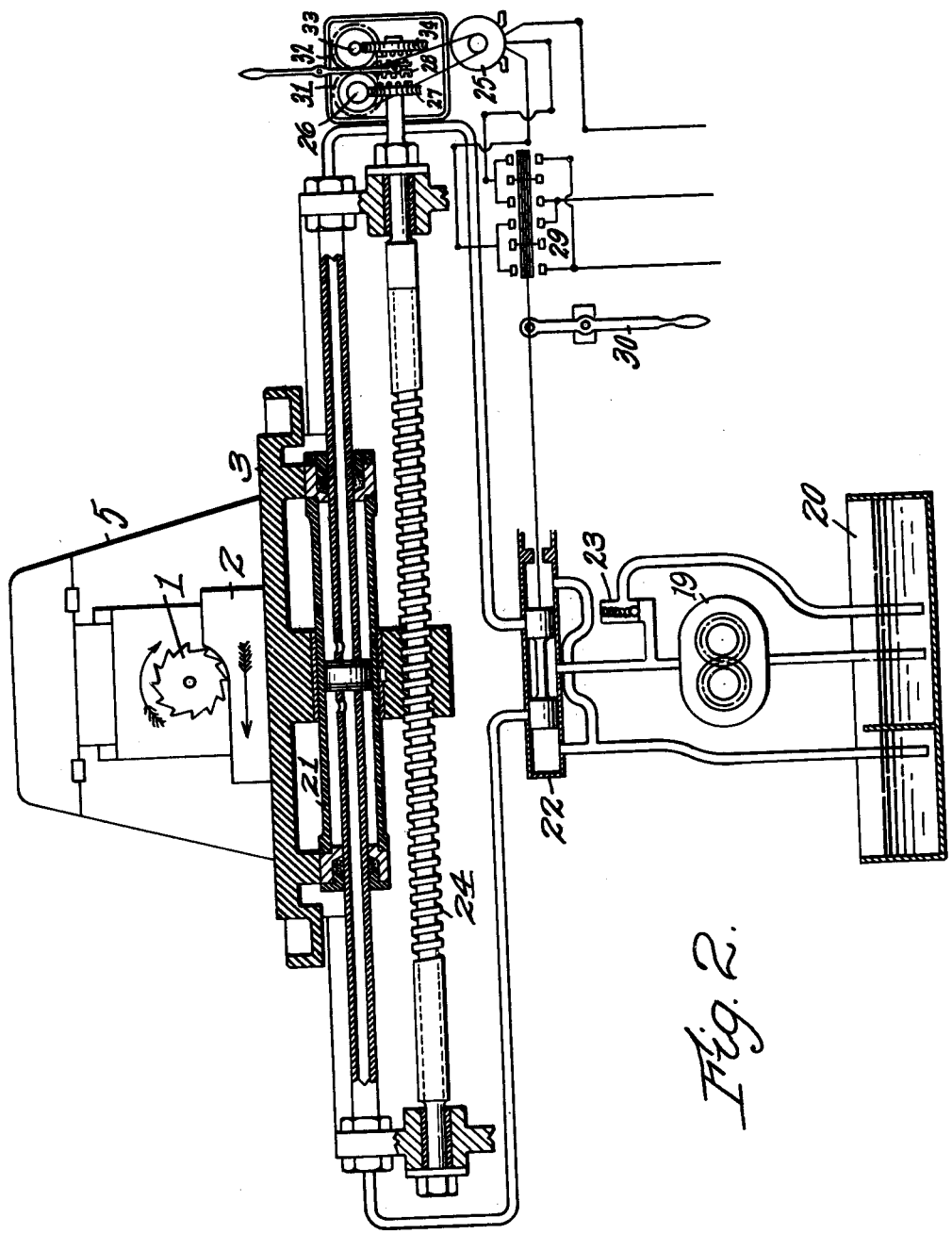

Patented Feb. 2, 1943

2,309,637

UNITED STATES PATENT OFFICE 2,309,637

CLIMB MILLING MACHINE

Ernest L. Fickett and William O. Forman, Fitchburg, Mass., assignors to Fitchburg Engineering Corporation, Fitchburg, Mass., a corporation of Massachusetts Application September 5, 1939, Serial No. 293,413

8 Claims. (Cl. 90—21.5)

The subject matter of this invention relates primarily to the art of milling, and particularly to "climb" milling, wherein the cutter rotates in a direction so as to tend to assist the work in its travel, i. e. the working portion of the cutter travels in the same direction as the work. In this type of machine any play or looseness in the feeding mechanism results in a tendency of the cutter to climb up out of the cut and thus to dig into the work and thrust it in the direction of the feed. This action causes chattering, prevents a smooth cut and is otherwise objectionable.

The principal objects of this invention are to provide means for obviating the above mentioned objectionable characteristics; to compensate for lost motion or looseness in the feed mechanism of a milling machine; to provide for a uniform and smooth feed of a work table past a cutter in the milling machine; to provide a machine for "climb" milling wherein the work is fed past the cutter by power means in conjunction with a device which limits the rate of feed to a predetermined speed regardless of any lost motion or looseness in the operative parts; to provide a power traveled work-table having an integral nut operatively connected with a stationary screw, the latter being rotated so that the work table, under the influence of its power feed, urges the nut against one side of the screwthreads at all times, whereby any poor fit or looseness in the machine parts cannot result in shaking of, or chatter in, the table; to provide a feed table having fluid pressure means for moving it, but in which the rate of movement is governed by means of the speed of rotation of a screw in conjunction with a nut fixed on the table and constantly urged against the screw by the fluid pressure means, this system being self-compensating, so that a uniform or smooth feed of the table does not depend on a good fit between the parts or between the nut and screw, or upon any device to close up the nut and compensate for its looseness.

Other objects and advantages of the invention will appear hereinafter.

Reference is to be had to the accompanying drawings, in which

Fig. 1 is a sectional view of the machine with certain parts shown diagrammatically; and Fig. 2 is a sectional view of a modification of the device shown in Fig. 1, with some parts shown diagrammatically.

While this application relates in general to "climb" milling, it must be definitely understood that the present arrangement is also desirable and practical for a conventional milling machine wherein the cutter rotates in a direction opposite to the direction of feed.

Referring to Fig. 1, a milling cutter 1 is shown as rotating in a clockwise direction, while the work 2, secured to the sliding table 3, is fed thereon from right to left. In the event of any play or looseness in the feed mechanism for the table, the cutter has a tendency to push the work faster than the normal speed of the feed, and, therefore, dig into, rather than smoothly cut, the work, and this action may even result in causing the cutter to ride on the work.

The sliding table 3 is mounted on the frame of a more or less conventional type milling machine 4, which also carries columns 5 (only one shown) which support a head 6 carrying a suitable spindle on which is mounted the cutter 1. Power to drive the spindle may be supplied by any recognized means, as belts, spur or helical gearing, worm gearing, or the like, and in most cases, the spindle will be driven by an independent power source.

Attached to the bottom of the table 3 and movable therewith is a hydraulic cylinder 7 which is shown as provided with the double piston rod 8 extending from both ends thereof. However, the double rod is not necessary to the successful operation of the device, but may be used to facilitate absolute accuracy of feed of the table in either direction. The rod 8 is anchored at both ends to the frame of the machine by means of an adjustable nut connection, as shown, and is provided with a piston 8' near its center, located in the cylinder. The rod 8 is hollow to provide conduits for the conveyance of fluid to the piston, through passages 8''.

The table 3 also carries a non-rotatable nut 9 which engages the feed regulating screw rod 10. This rod is confined in bearings in the frame of the machine, and is prevented from endwise movement by any desired form of conventional thrust bearing. On one end of the screw rod there is mounted a gear 11 meshed with a pinion 12 which is mounted on the shaft of the fluid motor 13. This motor is of the type which is ordinarily arranged so that when pressure is applied to one port and exhaust to the other, it will rotate in one direction, and when this is reversed, i. e., pressure applied to what was the exhaust port and the exhaust connected to the former pressure port, the motor will rotate oppositely. Inasmuch as this motor is of a well known design it has been shown merely diagrammatically.

Both the cylinder 7 and the motor 13 are connected by suitable conduits 18, 18' to the four-way valve 14, to which are also connected the conduit 17 and conduit 17' leading through the conventional hydraulic pumping unit 15, driven by a belt or shaft from a motor 16. The pump draws fluid from the tank 15' and the exhaust from the entire system returns to the tank.

The pump is desirably the variable delivery type and the selection of the volumes involved has a bearing on the operation of the system. However, it is not necessary to use a variable delivery pump, the system being operable through the use of a constant delivery pump and some form of metering valve that will determine the rate of flow, or by using a constant delivery pump and a variable stroke motor so that the speed of rotation of the motor may be governed by varying the stroke of its pistons.

The hydraulic pump 15 may ordinarily have two different displacements; that is, a large volume low pressure displacement for rapid traversing of the table, and a low volume high pressure discharge for feeding. In some commercial units this change takes place automatically and in others it is necessary to operate a valve to change from rapid traverse to feed. The hydraulic jump just generally described is conventional, and therefore has been shown only diagrammatically.

In the operation of the device, the pump 15 is started and the valve 14 is displaced to the left so that fluid from the conduit 17 applies pressure to the left end of the cylinder through the conduit 18. If the screw 10 and nut 9 were not engaged, the table would immediately move from right to left, but in the present case the first effect of the pressure is to engage the nut tightly against the right hand edge of the threads on the screw rod 10. The volume of the pump 15, however, is so regulated that there is more than enough fluid discharged through the valve to fill the cylinder and consequently there is a flow of fluid to the motor 13 which operates the same to rotate the screw rod 10 in such direction that the table be allowed to move from right to left under influence of the pressure in the conduit 18. The effect of this movement is somewhat analogous to that of lowering a load with a jack, the pressure in the cylinder 7 producing the load, and the screw rotates, allowing the movement and regulating it. The rate of this movement is governed by the amount of fluid delivered to the cylinder and the motor, bearing in mind that the required amount of fluid to cause movement by the cylinder is very small relative to the amount required to rotate the motor and screw. Moving the four-way valve 14 to the right reverses the flow of fluid relative to the cylinder and motor, and reverses the direction of rotation of the screw and the movement of the table, and the conduit 18' becomes the pressure line and the conduit 18 becomes the exhaust.

To effect rapid traverse of the table, the valves are placed in their respective positions and the pump 15 is manually, electrically, or otherwise, shifted so that the large volume discharge from the pump is available.

The gear 11 and pinion 12 are not essential, and the motor 13 might well be connected directly to the screw. However, if fine feeds are involved and relatively slow rotation of the screw is desired, the gear and pinion is a convenient arrangement.

It is to be noted that the feed of the table is produced by the pressure in the cylinder, but the rate of feed is governed by means of the speed of rotation of the screw, both of these effects being dependent on the pump 15 and valve 14. It is evident that the pressure in the cylinder causes the nut to press against the screw at all times and therefore any play or looseness in these members is compensated for automatically and this does not depend on a good fit between the screw and nut or upon any device to close up the nut relative to the screw to compensate for looseness.

There may be variations of the general arrangement of this invention and one such is disclosed in Fig. 2. Here, the cutter, frame and table are the same as in Fig. 1, and the pump 19, driven by a motor or other suitable means, draws fluid from the tank 20 and delivers it to either end of the hydraulic cylinder 21 through a four-way valve 22.

In order to insure that this cylinder will at all times be full of fluid under pressure, a pump is selected having greater capacity than is required, and a relief valve 23 is placed in the discharge line of the pump and set at the required pressure so that any excess fluid will return to the tank 20. This hydraulic pump 19 may be of the single delivery or multiple delivery type. This, as in the previous case, will apply sufficient pressure to the cylinder in the table to feed the table under any conditions, but the rate of feed is again governed by the rate of rotation of feed screw 24, which, in this case, is driven by a mechanical gear box. While there is an endless variety of gear boxes available, we have shown a box in which a motor 25 drives a shaft 26 having a worm cut on it engaging a worm wheel 27. This worm wheel is free to rotate on the screw 24 unless a clutch 28 is engaged therewith. The direction of rotation of this motor is controlled by double throw switch 29 shown diagrammatically. This is moved by a handle 30 which is also connected to the four-way valve 22 so that for a predetermined direction of rotation of the motor 25 there is a definite position of the valve 22. This brings about the same result as previously described, that is, pressure is applied in the cylinder to feed the table in a given direction, and the screw is mechanically rotated to allow the table to feed in that direction but at a predetermined rate and with the screw and nut always locked together in the direction of feed.

The shaft 26 provides for a pickoff gear 31 which engages a mating pickoff gear 32 mounted on the shaft 33 which also carries a worm engaging a worm wheel 34. It is quite evident that if the clutch 28 were engaged in the worm wheel 34, movement to the screw 24 would be through that medium, and these elements are ordinarily made with a low ratio on the worm shaft 26 and wheel 27 which gives a rapid movement for rapid traverse, and a high ratio between worm wheels 33 and 34 which gives a low movement for feeding, and changing pickoff gears 31 and 32 changes the rate of feed with a constant motor speed. This again accomplishes the same purpose as the device previously described, that is, the actual movement of the table is provided by the hydraulic cylinder and the rate of movement of the table is determined by the rotation of the screw 24.

It may be noted that even if half or more of the width of the thread were removed, the possibilities of back lash and table movement would still not be present, due to the fact that the cylinder constantly maintains the nut in contact with one side of the screwthread.

Having thus described our invention and the advantages thereof, we do not wish to be limited to the details herein disclosed, otherwise than as set forth in the claims, but what we claim is:

1. In a milling machine, a frame, a rotary cutter, a feed table, pressure means to feed the table forwardly and reversely, means to regulate the rate of feed of the table comprising a nut fixed to the table, a screw rod engaged therewith and journalled against longitudinal movement in the frame, power means to rotate the screw, said power means being constructed and arranged to travel the nut at a speed less than the potential speed of the table under influence of the table feeding means, said power means comprising an electric motor, a reversing switch therefor, means to reverse the direction of action of said pressure means, a link connecting said switch and said reversing means for simultaneous operation of both means, and means to move said link in two directions.

2. In a milling machine, a rotary cutter mounted on a frame, a feed table for the work movable on the frame with respect to the cutter and having a cylinder connected thereto, there being a piston in the cylinder, the piston having a piston rod which extends outwardly beyond the end of the cylinder, the piston and its rod being fixed on the frame, a nut non-rotatably mounted on the table for movement therewith and operatively connected with a screw rod, the latter being fixed against longitudinal movement, a pump for supplying pressure between the cylinder and piston to move the table, a motor to rotate the screw rod in such manner that the nut is traveled by the screw at a speed less than the potential speed of the table under influence of the fluid pressure, causing a tendency to a pressing action between the nut and screw, a slide valve for said pump, a reversing switch for said motor, a link connecting said valve and said switch, and means to move said link.

3. In a milling machine, a frame, a cutter on said frame, a work table, means to travel said table relative to said cutter, said means comprising a cylinder fixed to said table, a piston in said cylinder, valves and valve control means for cylinder and piston, a nut on said table, a screw shaft engaging said nut, an electric motor for rotating said screw shaft, a switch for said motor, a switch operator, and a link connecting said valve control means and said switch operator for simultaneous operation thereof.

4. In a milling machine, a frame, a cutter, a table movable with relation to said cutter, a cylinder member, a pair of supports depending from said frame in line with said cylinder and spaced apart a distance substantially greater than the length of the cylinder, the latter being located between said supports, a piston in said cylinder, a piston rod member, one of said members being secured at its ends to said supports, said rod member passing axially thru the cylinder member, a nut on said table, a screw shaft journalled at its ends in said frame adjacent said supports and engaging said nut, means to apply pressure to either side of said piston, means to rotate said screw, and means controlling the operation of said pressure applying means and said screw rotating means to insure concerted action thereof in either direction.

5. In a milling machine, a frame, a cutter on said frame, a table movable with relation to said cutter, a cylinder member, supports on said frame aligned axially and spaced from the ends of said cylinder, a piston in said cylinder, a piston rod member extending from at least one end of said piston to a position exterior of said cylinder, one of said members being fixedly mounted at its ends to said supports, a screw shaft journalled for rotation in said frame, a nut on said table engaging said screw shaft, means to rotate said shaft, said means being adjustable to vary the speed of said shaft, a motor to drive said rotating means, a reversing switch for said motor, means to apply pressure to either side of said piston, a valve for controlling said pressure applying means, said switch and said valve being connected for substantially simultaneous operation and being arranged so that when the motor is driven in a predetermined direction the valve will be in position to provide for the application of pressure to the piston in a direction corresponding to the rotation of the screw for advancing or retracting the table.

6. A milling machine as recited in claim 4 wherein said pressure applying and screw rotating means comprise a hydraulic system including a pump for supplying fluid to said cylinder and a fluid motor, said motor being operable to rotate the screw.

7. A milling machine as recited in claim 4 wherein said pressure applying means comprises a pump and said screw rotating means comprises a motor, said controlling means being operable to control the delivery of the pump and the operation of the motor substantially simultaneously.

8. A milling machine as recited in claim 4 wherein said pressure applying means comprises a fluid pump and said screw rotating means comprises a separately powered motor, there being a single operating device for said controlling means for substantially simultaneous control of said pump and said motor.

ERNEST L. FICKETT.
WILLIAM O. FORMAN.